Oct. 6, 1970     C. J. STALEGO     3,532,479
APPARATUS FOR PRODUCING GLASS FIBERS
Original Filed Sept. 29, 1966
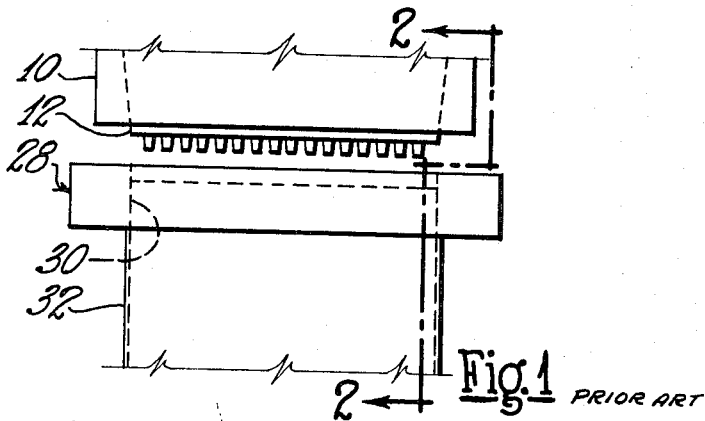
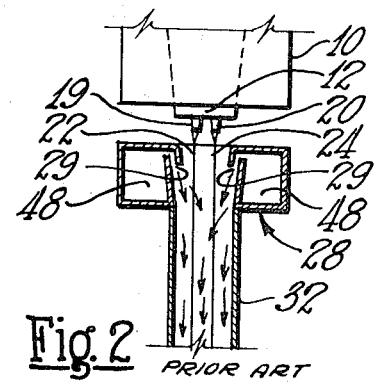
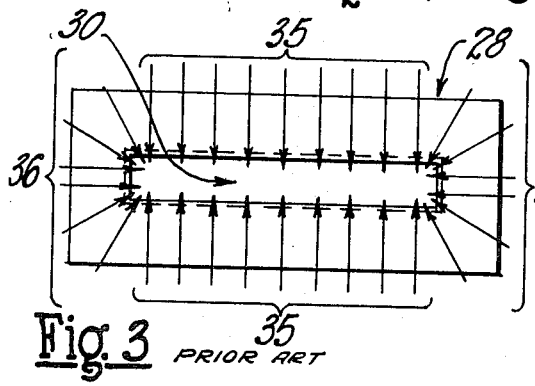
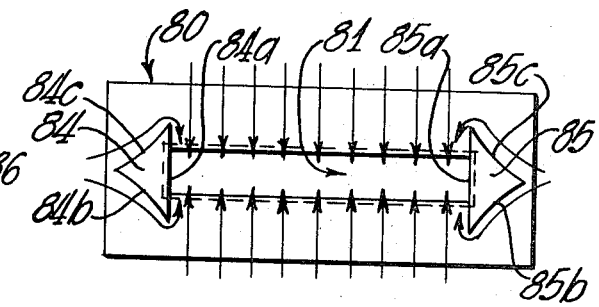
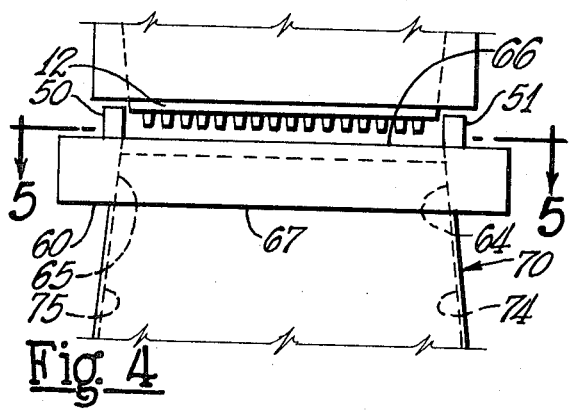
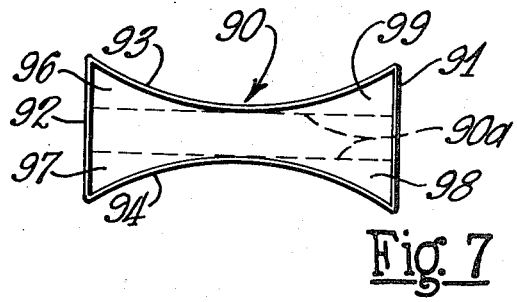
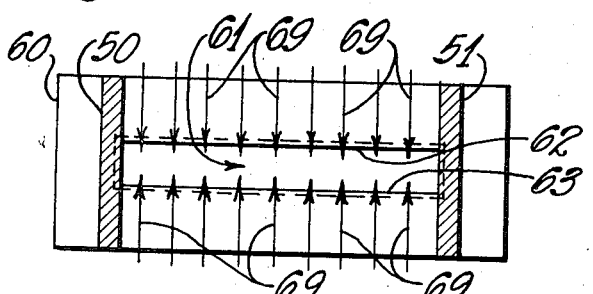
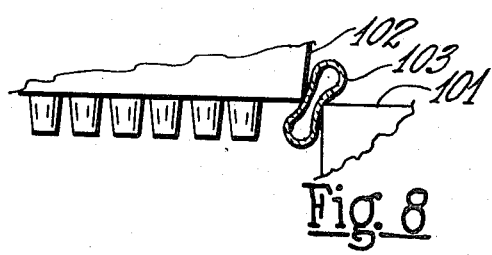
INVENTOR.
CHARLES J. STALEGO
BY Staelin + Overman
ATTORNEYS

United States Patent Office 3,532,479
Patented Oct. 6, 1970

3,532,479
APPARATUS FOR PRODUCING GLASS FIBERS
Charles J. Stalego, Newark, Ohio, assignor to Owens-Corning Fiberglas Corporation, a corporation of Delaware
Continuation of application Ser. No. 582,825, Sept. 29, 1966. This application July 15, 1969, Ser. No. 847,498
Int. Cl. C03b 37/06
U.S. Cl. 65—16
8 Claims

ABSTRACT OF THE DISCLOSURE

Apparatus for attenuating fibers through an elongated slot in a blower housing in which axial air flow into the slot is blocked, permitting only transverse air flow. The end walls of the slot may be diverged to decrease air turbulence. An open ended skirt may be positioned adjacent the under side of the housing. The skirt may have diverging end walls, which may be continuations of the end walls of the slot. The skirt may have downwardly extending end walls and arcuate side walls connecting the end walls. The constructions of the skirt decrease air turbulence.

---

This application is a continuation of application Ser. No. 582,825, filed Sept. 29, 1966, now abandoned.

The present invention relates to a method of and an apparatus for producing fibers from heat-softenable materials and more especially to the production of fibers by attenuation through the utilization of high velocity gaseous or fluid blasts.

Glass fibers have been produced extensively by attenuating streams of glass by engaging the streams with high velocity gaseous or fluid blasts, the fibers being employed for mats, batts and the like. In such processes attenuation of the glass streams is attained by directing blasts of steam, compressed air or other blowing media under pressure from nozzles or orifices of a blower, the blasts of fluid being directed at opposite sides of one or more rows of streams. Fibers attenuated by such process have been used to form a fibrous mat containing a suitable binder which is cured to hold the fibers in an integrated assembly, such product being generally known as a bonded mat.

In such production of fibers feeder means having orifice means formed therein for issuing streams of molten material have been positioned above a blower means for the fluid blasts. The blower generally comprises a housing disposed beneath the feeder and has a pressure chamber therein. The housing has a walled slot extending therethrough with inlet and outlet openings for receiving the streams. Orifice means formed along the slot allow the issuance of jets of fluid from the pressure chamber into the slot to engage the molten streams. The orifice openings are so positioned with respect to the slot as to cause a current of air to be drawn in through the slot inlet by the jets. Since the induced air current enters the slot from all directions, axially as well as transversely with respect to the slot, a considerable air turbulence results which causes the steams of fibers being attenuated to coverage, "neck in" or otherwise be forced into a disordered array which is unsatisfactory since the attenuated fibers are generally to be deposited directly upon a collecting surface to form the mat. This means that the mat formation is nonuniform and that the width of deposition cannot be accurately controlled. Further, since the orificed tips at the end of an elongated feeder are exposed to the axially flowing air currents as well as to the transversely flowing air currents which are induced by the gaseous blasts within the blowers, the outermost or end-most orificed tips tend to become cooler than the center row of tips producing a nonuniformity in the diameter of the fibers being attenuated as well as disturbing the ability of these tips to provide fibers that are as long as those attenuated from the intermediate tips on which the temperature may be more closely controlled.

Accordingly, it is an object of this invention to provide an improved method and apparatus for producing fibers.

It is a further object of this invention to provide an improved method and apparatus for producing fibers which are attenuated through the utilization of high velocity fluid blasts in which the diameters of the fibers are more uniform, in which the length of all the fibers attenuated are more uniform, and which allows wider deposition widths to be obtained.

Another object of this invention is to provide an improved method of and apparatus for producing fibers from heat-softenable materials by attenuation through the utilization of high velocity fluid blasts in which the attenuation is so controlled so that the one or more rows of streams and resulting fibers will not be converged together and will thus avoid narrow deposition widths and disarray within the converged fibers.

The invention features apparatus for producing fibrous material which comprises feeder means having orifice means formed therein for issuing streams of molten material and blower means comprising a housing disposed beneath the feeder means having a pressure chamber therein and having a walled slot for receiving the streams. The housing has orifice means formed along the slot for the issuance of jets of fluid from the pressure chamber into the slot. The orifice openings are so positioned with respect to the slot as to cause a current of air to be drawn through the slot inlet by the jets. Means are disposed between the blower means and the feeder means at each end of the slot for blocking the flow of air axially into the slot to prevent interference with the transverse air flow into the slot and thus avoid turbulence which causes a convergence or necking in of the one or more rows of fibers or streams. Gasket means, such as a tube of asbestos may be positioned between the feeder means and the flow blocking means to prevent air flow over the blocking means. The flow blocking means may comprise baffle means extending across the housing at each end of the slot. Alternatively, the flow blocking means may include aerodynamic foils located at each end of the slot and positioned to divert air flow away from the ends of the slot.

The end walls of the slot may diverge outwardly from the inlet to the outlet openings of the slot to accommodate expanding air turbulence. The apparatus may further include an elongate open ended structure associated with the housing and constituting a smooth continuation of the slot therein, the structure having end walls that diverge outwardly from the outlet opening of the slot. Alternatively, the apparatus may further include skirt surfaces associated with the housing and constituting smooth continuations of the side walls of the slot from the outlet opening thereof, the ends of the area defined by the skirt surfaces being left open. In a still further embodiment of the invention the apparatus may include an elongate open ended structure associated with the housing having end walls which extend downwardly from the end walls of the slot and arcuate side walls connecting the end walls. Each arcuate side wall is positioned substantially tangential to a plane defined by a corresponding side wall of the slot at a line vertically bisecting the corresponding side wall.

The invention embraces the method of forming fibers from heat-softened material by blast attenuation which includes the steps of flowing streams of the material from the supply thorugh an elongated walled passage, engaging the material of the streams in the passage by high velocity fluid blasts discharging downwardly from the side walls of the passage, and confining the air flow induced into the upper opening of the passage by the blasts to transverse entry while blocking any axial entry of the air flow into the upper opening of the passage. The method may further include the step of diverging the end walls of the passage from the upper opening to a lower opening of the passage to accommodate expanding air turbulence and prevent the convergence of the fibers being formed.

In addition the invention embraces a method of forming fibers from heat-softened material by blast attenuation which includes the steps of flowing streams of material from a supply into an elongated walled passage, engaging the material of the streams in the passage by high velocity fluid blasts discharging downwardly from the side walls of the passage, and forming the passageway to accommodate expanding air turbulence and prevent the convergence of the fibers being formed. The passageway forming step may include diverging the end walls of the passage outwardly from an upper opening to a lower opening of the passage. As an alternative the passageway forming step may include arcuately flaring each side wall of the passage outwardly from a center line of the side wall.

Other objects, advantages and features of this invention will become apparent when the following description is taken in conjunction with the accompanying drawings, in which:

FIG. 1 is a side elevational view of a fiber forming apparatus illustrating the problems encountered in the prior art;

FIG. 2 is an end view of the apparatus illustrated in FIG. 1 taken partly in section along lines 2—2 of FIG. 1;

FIG. 3 is a plan view of the blower apparatus illustrated in FIG. 1 showing the problems presented by induced air flow;

FIG. 4 is an elevational view of a fiber forming apparatus embodying the teachings of this invention;

FIG. 5 is a cross sectional view of the apparatus of FIG. 4 with the section taken along lines 5—5;

FIG. 6 is a plan view of a blower illustrating the use of an alternate axial air flow blocking apparatus;

FIG. 7 is a plan view of an extension skirt illustrating alternative approaches to the teachings of this invention; and FIG. 8 is an enlarged detail view illustrating the use of a gasket sealing between the air blocking means and the feeder means.

Referring to the arrangement illustrated in FIGS. 1 through 3 of the drawings, there is illustrated a means such as a receptacle 10 adapted to contain a supply of heat-softened fiber-forming material such as glass, the glass being in molten or flowable condition. The receptacle 10 may be connected with a melting furnace (not shown) in which the glass batch or other mineral material is reduced to a molten or flowable state and flows from the furnace to the receptacle 10.

The receptacle 10 is fashioned of refractory or other material capable of withstanding high temperatures and is equipped with a stream feeder or bushing 12. The stream feeder 12 is mounted in the floor of the receptacle 10 and is preferably made of an alloy of platinum and rhodium. The feeder 12 is preferably of elongated rectangular shape, the end walls of which may be provided with lugs for connection with conductors of an electric current for flowing control current through the feeder 12 to maintain the glass in the feeder at the proper temperature and viscosity.

As illustrated in FIGS. 1 and 2, the bottom region of the stream feeder 12 is formed with lengthwise arranged rows 19 and 20 of tips or projections provided with orifices or passages through which rows or groups of streams 22 and 24 flow downwardly from the feeder in substantially parallel relation.

Disposed beneath the feeder 12 is a blower construction 28 formed with an elongated passage or slot 30 extending lengthwise of the blower through which the rows of streams flow from the feeder. An elongate structure 32 is provided in association with the blower 28 which forms a continuation of the slot 30 and may be attached to or secured against the blower 28 by any means known to and suitable to those skilled in the art. A fiber collecting means such as a conveyor of foraminous or reticulated character is generally positioned below the fiber forming region of the station illustrated in FIGS. 1 through 3 and is arranged to move the collecting surface past the fiber forming area. The blast attenuated fiber may be collected in a comparatively thin layer upon the advancing flight of the conveyor where it is desired to form a comparatively thin bonded mat of the fibers. Applicators such as spray nozzles may be arranged or adapted to spray or deliver a binder, adhesive or other fiber-coating material onto the fibers as they are deposited on or move along on the collecting surface.

A pipe or other delivery means (not shown) is joined with the pressure chambers 48 formed in the blower 28 to convey steam, other gas under pressure, or a desired blowing media to the blower.

In operation the blower structure 28 is preferably positioned a short distance beneath the source of molten material, here illustrated as the tips of the electrically heated bushing 12. When hot glass or other material is caused to flow from the bushing tips, fluid pressure is applied to the blower 28 and high velocity jets issue from openings 29 formed in the side walls of the slot 30 and are directed downwardly into the slot 30. The jets converge below their openings and by their aspirating action suck in a considerable body of air through the inlet or top of the slot 30 about the tips of the bushing 12. This air attains sufficient velocity to draw the issuing glass away from the bushing and down into the slot of the blower where a gradually increasing tractive force is applied to the streams, increasing their velocity and attenuating the streams to fibrous form.

Referring to FIG. 3 it will be noted that the air flow over the top of the blower 28 may be divided into air flow transverse to the slot 30 which is designated by the arrows 35 and induced air flow which is axial or other than transverse to the slot 30, designated by the arrows 36. Since more air flow is traveling around the ends of the slot 30 due to the presence of both transverse and axial air flow in the end areas the friction in the slot 30 is greater at the end than at the center since a greater mass of air is drawn in at the end positions. Thus the induced air streams being drawn in at the end slows resulting in a higher pressure and an expanding turbulence area which pushes the streams and fibers inwardly and causes the row or rows of fibers to converge or neck in. Further, there is a temperature differential since the centrally located tips are exposed to a different velocity and quantity of air flow than the outermost or end-most tips of the rows 19 and 20. Therefore, the temperature of the outermost or end-most tips of the rows 19 and 20 varies from the temperature of the intermediate tips resulting in nonuniform diameters of fibers being drawn from the respective sets of tips as well as nonuniformities in the lengths of fibers which may be attenuated from the respective sets of tips.

Referring to FIGS. 4 and 5 there is illustrated apparatus embodying the teachings of this invention which overcomes the problems illustrated in connection with the operation of the prior art apparatus shown in FIGS. 1 through 3. To prevent the axial or other than transverse air flow baffles 50 and 51 have been positioned at the ends of the slot 61 of the blower 60. The baffles 50 and 51 extend from the blower 60 upwardly and adjacent to the feeder 12 thus preventing the axial or other than transverse air flow. As best seen in FIG. 5 the induced air flow is now completely transverse as noted by the arrows 69 and a substantially equal amount of air is supplied to the slot 61 from each side of the blower 60. Thus the possibility of air turbulence resulting from axial air flow is substantially eliminated and the necking in or convergence of the row or rows of streams being formed into fibers is correspondingly reduced.

In addition to the provision for blocking the axial flow of air into the slot 60 by the use of baffles 50 and 51 is also advantageous to diverge the end walls 64 and 65 of the walled slot 60 outwardly from the upper inlet 66 of the slot 60 to the lower outlet 67 of the slot 60. This provides room for any remaining air turbulence to expand outwardly and thus not interfere with the downward movement of the fibers or streams issuing from the feeder 12.

It will be further noted in FIG. 4 that the skirt utilized in association with the blower 60 includes an elongate open ended structure 70 associated with and positioned adjacent an under side of the housing 60 and constituting a smooth continuation of the slot 30 of the blower 60. The structure 70 has end walls 74 and 75 that diverge outwardly from the outlet opening 67 of the slot 61 formed in the housing 60. The divergence of the end walls 74 and 75 of the skirt 70 provide further expansion room for the air turbulence and thus again removes the pressuring or crowding in of air to converge or "neck in" the row of rows of streams or fibers. It should be noted that substantially the same effect may be obtained by removing end walls 74 and 75 of the skirt 70.

As a result of experiments conducted with diverging the end walls of the blower slot and the end walls of the associated skirt, it has been determined that a divergence of 15 degrees to 45 degrees will be sufficient, depending upon the velocity of the jet blasts, size of the slots, use of axial air baffles, etc.

Referring to FIG. 6 there is illustrated a plan view of a blower 80 having a walled slot or passageway 81 formed therein in which axial air flow blocking means 84 and 85 are provided. The walls 84a and 85a of the baffles 84 and 85 are parallel to the transverse air flows into the slot 81 and thus confine the air to a transverse flow into the slot 81 at the ends thereof. The remaining walls 84b, 84c and 85b, 85c of the baffles 84 and 85 are aerodynamically shaped as foils to divert axially flowing air away from the ends of the slot 81. The diverted air thus becomes entrained with the transversely flowing air and reduces the possibilities of air turbulence as described hereinbefore. The baffle means 84 and 85 are constructed to be disposed adjacent the feeder to prevent air flow over the top of the baffles.

Referring to FIG. 7 there is illustrated a plan view of an alternate construction of a skirt for use beneath a blower of this invention. The dimensions of a slot in a blower housing to which the skirt 90 is to be attached are noted by the dotted lines 90a. Thus the end walls 91 and 92 of the skirt 90 extend downwardly to form a smooth continuation of the end walls of a slot of a housing of a blower. Side walls 93 and 94 are arcuately shaped. Each arcuate side wall is positioned substantially tangential to a plane defined by a corresponding side wall of a slot of a blower at a line vertically bisecting the corresponding old side wall. The increased cross-sectional area at the corners afforded by the outwardly flaring side walls is noted by the reference characters 96, 97, 98 and 99. This provides increased volumetric room for the air turbulence connected with the blower blasts to expand so that the row or rows of streams and fibers are not pushed or converged inwardly within the slot and connecting skirt.

It is to be noted that although the slot formed in the blower and the slot formed in the elongate open ended structure or skirt have been separately discussed hereinbefore, that the two slots of the skirt and blower structures may be defined as a single passageway in which the end walls may be flared or diverged and/or which may also include the arcuate side wall structure shown in FIG. 7.

Referring to FIG. 8 there is illustrated a means for blocking any possible air flow between the top of an end baffle 101 and the lower edge of a feeder 102. Since the structures of both the baffle 101 and the feeder 102 will expand and contract with changes in temperatures a gasket 103 in the form of a flexible or hollow member, such as an asbestos or other heat resistant material tube, may be utilized to block the air flow while actually avoiding any contact or pressure between the baffle 101 and the feeder 102.

It is apparent that within the scope of the invention, modifications and different arrangements may be made other than is herein disclosed, and the present disclosure is illustrative merely, the invention comprehending all variations thereof.

I claim:

1. Apparatus for producing fibrous material comprising feeder means having orifice means formed therein for issuing at least one row of streams of molten material, blower means comprising a housing disposed beneath said feeder means having a pressure chamber formed therein and having an elongated walled slot closed by straight end walls extending through the housing with inlet and outlet openings for receiving and discharging said streams, said housing having orifice means formed along said slot for the issuance of jets of fluid from said pressure chamber into said slot, said orifice openings being so positioned with respect to said slot as to cause a current of air to be drawn through said slot inlet by said jets, and means extending from said blower means to said feeder means and above said housing at each end wall of said slot for blocking the flow of air axially into said slot to prevent interference with transverse air flow into said slot and excessive cooling of molten streams adjacent the ends of said elongated slot, each flow blocking means at each end having a transversely extending wall aligned with each end wall of said slot.

2. Apparatus as defined in claim 1 in which said flow blocking means at each slot end wall further includes walls shaped in the form of aerodynamic foils extending away from each of said slot to divert air flow away from the ends of said slot.

3. Apparatus as defined in claim 1 in which the straight end walls of said slot diverge away from each other from the inlet to the outlet openings of said slot.

4. Apparatus as defined in claim 1 which further includes an elongate open ended hood structure positioned adjacent an under side of said housing and constituting a continuation of the slot therein, said structure having end walls that diverge outwardly from the outlet opening of said slot.

5. Apparatus as defined in claim 1 which further includes an elongate open ended structure positioned adjacent an under side of said housing having end walls which extend downwardly from the end walls of said slot and arcuate side walls connecting said end walls, each arcuate side wall being positioned substantially tangential to a plane defined by a corresponding side wall of said slot at a line vertically bisecting said corresponding side wall.

6. Apparatus for producing fibrous material comprising feeder means having orifice means formed therein for issuing at least one row of streams of molten material, blower means comprising a housing disposed beneath said feeder means having a pressure chamber formed therein and having an elongated walled slot closed by end walls extending through the housing with inlet and outlet openings for receiving and discharging said streams, said housing having orifice means formed along said slot for the issuance of jets of fluid from said pressure chamber into said slot, said orifice openings being so positioned with respect to said slot as to cause a current of air to be drawn through said slot inlet by said jets, and an elongate open ended hood structure positioned adjacent an under side of said housing and constituting a continuation of the slot therein, said hood structure having end walls that diverge outwardly away from each other from the outlet opening of said slot.

7. Apparatus as defined in claim 6 in which the end walls of said slot diverge outwardly away from each other from the inlet to the outlet openings of said slot.

8. Apparatus for producing fibrous material comprising feeder means having orifices formed therein for issuing at least one row of streams of molten material, blower means comprising a housing disposed beneath said feeder means having a pressure chamber formed therein and having an elongated walled slot closed by end walls extending through said housing with inlet and outlet openings for receiving and discharging said streams, said housing having orifice means formed therein for the issuance of jets of fluid from said pressure chamber into said slot to cause a current of air to be drawn through said slot inlet, and an elongated open ended hood structure positioned adjacent an under side of said housing having end walls which extend downwardly from the end walls of said slot and arcuate side walls connecting said end walls, each arcuate side wall being positioned substantially tangential to a plane defined by a corresponding side wall of said slot at a line vertically bisecting said corresponding side wall.

References Cited

UNITED STATES PATENTS

| | | | |
|---|---|---|---|
| 2,206,060 | 7/1940 | Slayter | 65—16 X |
| 2,961,698 | 11/1960 | Rea | 65—5 X |
| 3,021,558 | 2/1962 | Roberson | 65—5 |
| 3,248,192 | 4/1966 | Millet | 65—5 |

S. LEON BASHORE, Primary Examiner

R. L. LINDSAY, Jr., Assistant Examiner

U.S. Cl. X.R.

65—4, 5; 264—12, 121